(No Model.)
N. SWARTZ, Jr., & H. M. WOOD.
MEAT SUSPENDER.
No. 565,943. Patented Aug. 18, 1896.
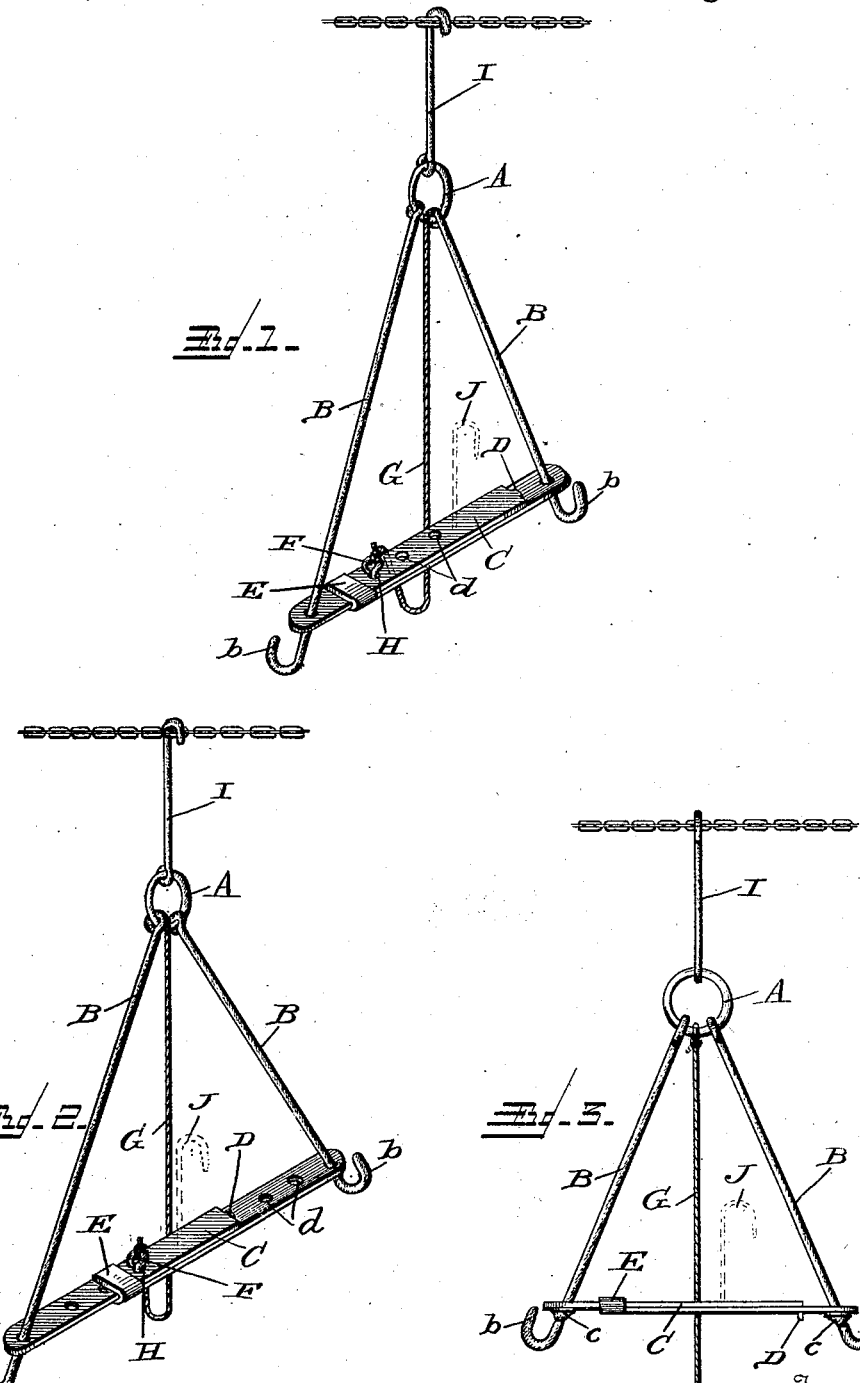

UNITED STATES PATENT OFFICE.

NICHOLAS SWARTZ, JR., AND HENRY MARSHALL WOOD, OF CARVERSVILLE, PENNSYLVANIA.

MEAT-SUSPENDER.

SPECIFICATION forming part of Letters Patent No. 565,943, dated August 18, 1896.

Application filed February 12, 1896. Serial No. 579,070. (No model.)

*To all whom it may concern:*

Be it known that we, NICHOLAS SWARTZ, Jr., and HENRY MARSHALL WOOD, citizens of the United States, residing at Carversville, in the county of Bucks and State of Pennsylvania, have invented certain new and useful Improvements in Meat-Suspenders; and we do hereby declare the following to be a full, clear, and exact description of the invention, such as will enable others skilled in the art to which it appertains to make and use the same.

This invention relates to certain new and useful improvements in devices for suspending meats in the market or stores or in the refrigerator; and it has for its object, among others, to provide a simple and cheap hanger and spreader by which the meat can be held more convenient for cutting and spread to any desired amount.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a perspective view of our improved meat-suspender. Fig. 2 is a view showing the spreader separated. Fig. 3 is a side elevation with the pin removed.

Like letters of reference indicate like parts in the several views.

Referring now to the details of the drawings by letter, A designates a ring of any suitable material and size.

B are rods or bars which are suspended from said ring, and their lower ends terminate in hooks $b$.

C is the spreader, composed of two pieces of metal, each supported at one end upon one of the rods upon which it is sleeved, so as to be adjustable in the direction of the length of the rod, and prevented from displacement downward by means of the heads or collars or analogous means $c$ on said rods, which collars or stops are arranged at a distance above the spreader, so as not to interfere with the hooks on the ends of the rods, which are used for hanging the meat or any other article thereon. The free end of one portion of the spreader is formed with a depending lug or projection D, adapted to engage in any one of the holes $d$ in the other part of the spreader, and the free end of the other part of the spreader is provided with a portion E, extending substantially parallel therewith, and into which the other part of the spreader is designed to be engaged, so as to hold the two parts in close contact. The parts are held in their adjusted position by placing the one part in the guide or holder of the other and inserting its projection or pin into one of the openings, and then a pin F, carried by a chain or cord G, is inserted or passed downward through two coincident openings H in the overlapping portions of the spreader, and thus firmly held. The device may be suspended by the ring or by hook or other device held in the ring.

I is an extra hook, which may be made to go from the ring to the chain, or a short hook J, (shown by dotted lines,) supported on the spreader, may be used for the same purpose.

Modifications in details may be resorted to without departing from the spirit of the invention or sacrificing any of its advantages.

Having thus described the invention, what is claimed as new is—

1. The combination of the ring and the hooked rods supported therefrom and formed with enlargements, of a spreader in two parts sleeved upon said rods and supported upon said enlargements, one of the parts being carried by each of the hooked rods and having provision for detachable connection of their opposite ends, substantially as described.

2. The combination with the ring and the hooked rods supported therefrom and provided with enlargements near their hooked ends, of a spreader in two parts sleeved on the rods and supported upon said enlargements, each formed with a plurality of openings and the one at its free end with a projection and engaged in one of the openings, and the other part with a guide and holding portion to receive the first-mentioned part, substantially as described.

In testimony whereof we have signed this specification in the presence of two subscribing witnesses.

NICHOLAS SWARTZ, JR.
H. MARSHALL WOOD.

Witnesses:
A. J. SWARTZ,
W. T. S. BLACK.